Dec. 4, 1956  J. E. NOWAK ET AL  2,772,671
MASON'S BRICK CUTTER
Filed March 28, 1955  2 Sheets-Sheet 1
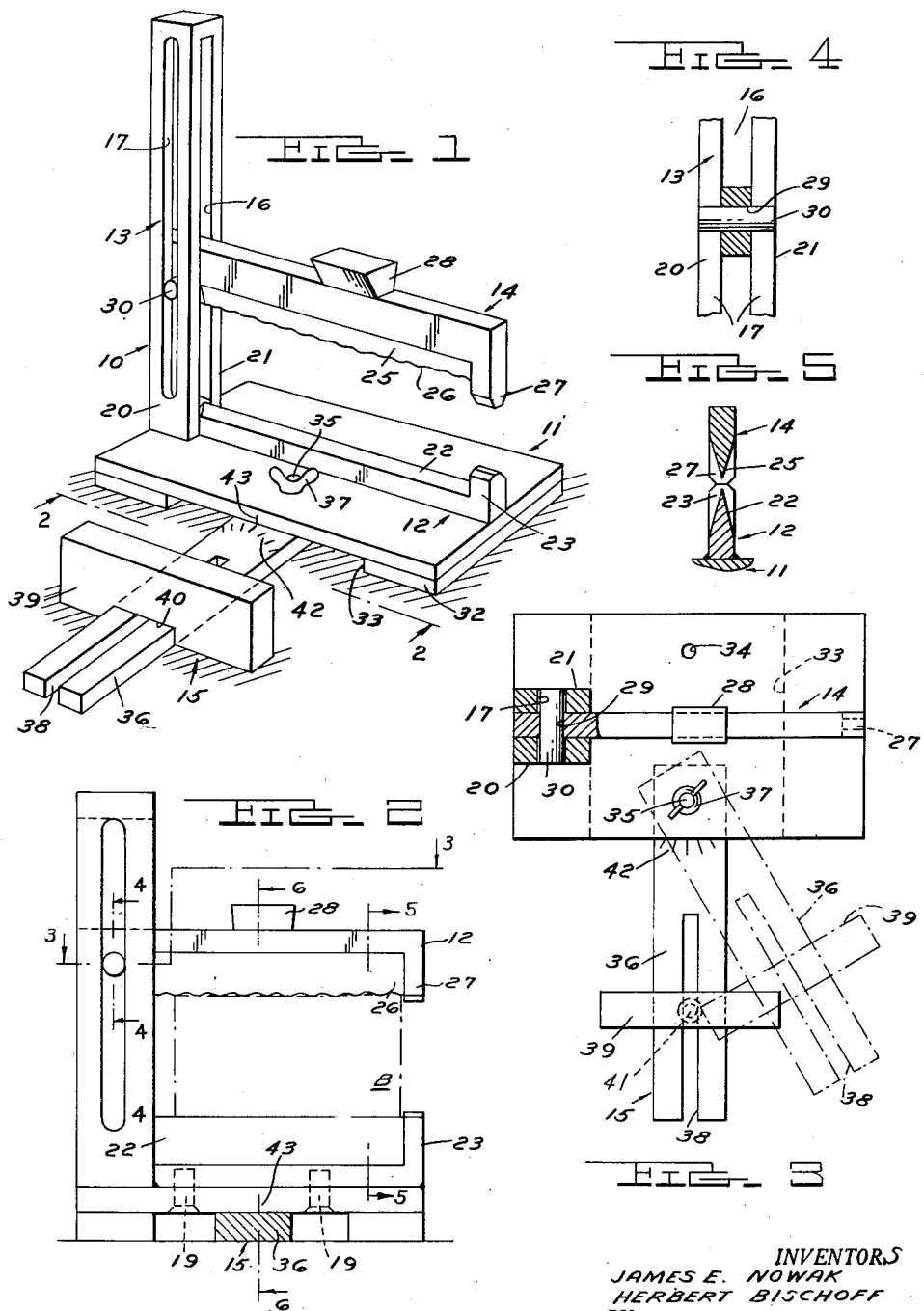
INVENTORS
JAMES E. NOWAK
HERBERT BISCHOFF
BY
ATTORNEYS Dec. 4, 1956  J. E. NOWAK ET AL  2,772,671
MASON'S BRICK CUTTER
Filed March 28, 1955  2 Sheets-Sheet 2
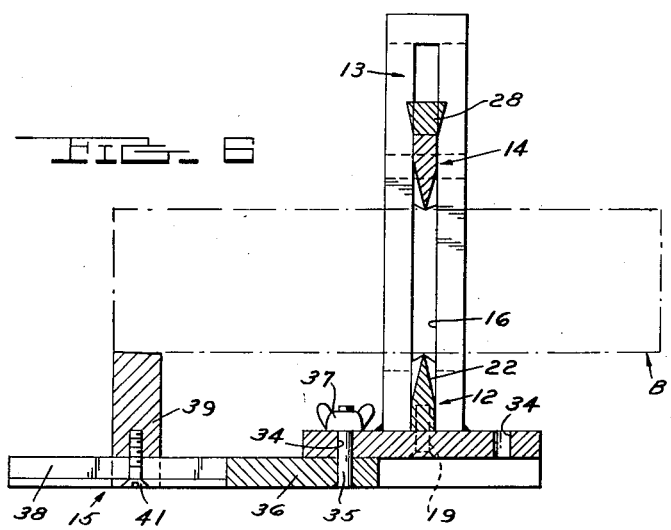
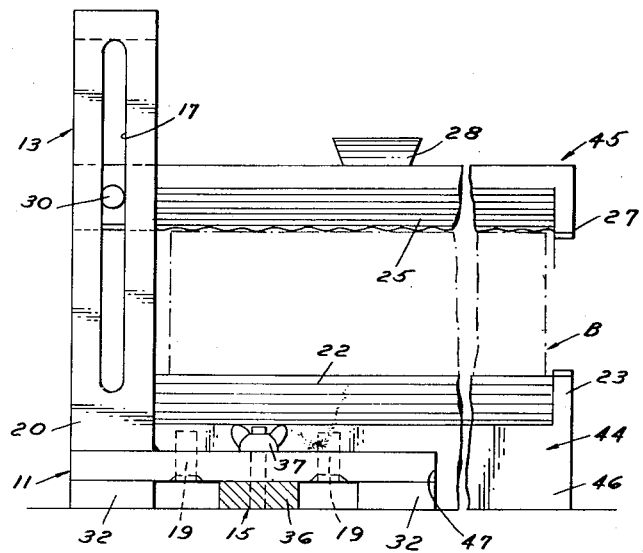
INVENTORS
JAMES E. NOWAK
HERBERT BISCHOFF
BY
ATTORNEYS

United States Patent Office 2,772,671
Patented Dec. 4, 1956

2,772,671

MASON'S BRICK CUTTER

James E. Nowak, Detroit, and Herbert Bischoff, East Detroit, Mich.

Application March 28, 1955, Serial No. 497,124

5 Claims. (Cl. 125—23)

The present invention relates to a simple and rugged, manually operated cutter for masonry articles such as brick, tile and the like. The invention particularly concerns a device of this type which is manually portable and may be carried by a mason from job to job, to be set up for operation in an instant's time.

Other than by the use of his trowel and hammer there is, to our knowledge, no simple, inexpensive and portable device available to a mason for on-the-job cutting of brick, tile, etc., to a desired length. Hydraulic press type cutters and carborundum saws have been employed off location in the past for this type of work, however, the excessive cost of such equipment puts it far beyond the reach of the ordinary mason.

Naturally, the cutting and fitting of brick and tile consume a considerable portion of the time expended by a mason on an ordinary job, and when a special construction is involved the time devoted to cutting will be greater. Moreover, there is a great deal of waste of material in the cutting of brick by masons, experienced or unexperienced. This may run as high as two bricks lost for each one cut to proper and desired size.

It is therefore an object of the invention to provide a portable mason's brick cutter which is low in cost and is efficient and reliable in operation, being capable of use by an inexperienced mason to obviate the loss of time and material referred to above. The improved cutter attains these objectives by reducing brick cutting time by a factor as great as 20 times, and by reducing the expected loss of material to the point in negligibility i. e., to a fraction of one percent. The cutter is characterized by a vertically movable and pivotal cutter blade co-acting with a similar but rigidly fixed lower blade which is mounted in the vertical plane of the movable blade. The floating blade is guided at one end only for free bodily rise and fall, as well as for free pivotal movement in the cutting plane.

By coupling a swinging action of the upper blade with its vertical translation, it is possible to locate the blade rapidly and properly in relation to bricks or other masonry objects of various types and dimensions. With the upper floating blade so positioned, a relatively light blow on the same severs the object cleanly and accurately.

A still further and more specific object of the invention is to provide a mason's brick cutter in which provision is made to prevent direct engagement of the upper and lower blades with one another, such as would soon dull the same, and in which the upper or floating blade carries an impact anvil to insure a properly distributed application of shearing stress across the object being cut.

A still further object is to provide a mason's cutter equipped with a longitudinally and angularly adjustable gauge to facilitate the proper lengthwise placement of a brick in relation to the cutting blade; as well as the angular gauging of the brick for a cut other than at a right angle.

Yet another object is to provide a cutting device as set forth above which is simple and rapidly manipulated in the removing and replacing of blades, as for the purpose of cutting a brick either across or parallel to its longitudinal axis.

The foregoing as well as other objects will be made more apparent as this description proceeds especially when considered in connection with the drawings, wherein:

Fig. 1 is a perspective view of the improved brick cutter;

Fig. 2 is a side elevational view of the cutter as viewed along section line 2—2 of Fig. 1;

Fig. 3 is a plan view of the device, partially broken away and sectional along line 3—3 of Fig. 2;

Figs. 4, 5 and 6 are, respectively, views in section upon lines 4—4, 5—5 and 6—6 of Fig. 2; and Fig. 7 is an elevational view similar to Fig. 2 illustrating an adaptation of the cuttter employing longer blades than depicted in Figs. 1 through 6 for the purpose of cutting a brick along its length.

Referring to Fig. 1 of the drawings, the cutter 10 of the invention embodies as its basic parts a rigid rectangular plate-like base 11 adapted to rest upon a supporting surface, on which base a bottom blade 12 is fixedly mounted; an upright guide 13 also fixed on base 11; a floating cutter blade 14 mounted for vertical shift and swinging movement in guide 13; and an adjustable gauge 15 by which a masonry object such as a brick B is positioned to be cut between blades 12, 14.

As shown in Figs. 1 through 6, the guide 13 is rigidly affixed to the base 11, as by welding, to extend upwardly at 90° to the upper surface of the base adjacent one end margin thereof. The guide may also have a releasable mount on the base in the event it is desired to furnish blades 12, 14 and guide 13 as a unit which may be removed and replaced in its entirety. Guide 13 is shown in the form of an elongated post of rectangular cross sectional outline (Fig. 3). It is centrally slotted in the direction of the length of blades 12, 14 to afford a blade guide channel or way 16 in which floating blade 14 is received for vertical sliding and pivotal movements, the channel being only slightly wider than blade 14. Channel 16 extends from base 11 substantially the entire height of guide 13, thereby permitting a large range of rise and fall of the blade to accommodate articles of differing depth. The guide 13 is further slotted to provide a second guide way or channel 17 at 90° to channel 16, for a purpose to be described.

The lower blade 12 is securely fixed to base 11 by means of one or more set screws 19 (Figs. 2 and 5), which are tapped in base 11 and the under side of blade 12, being either sunk into or flush with the bottom of base 11 when fully taken up. Fixed blade 12 is co-extensive in length with the end to end dimension of base 11, as depicted in Fig. 1; the inner end thereof is received between the two legs 20, 21 of upright guide 13 which are defined by the channel slotting of the latter.

The sides of blade 12 are ground to provide an upwardly exposed longitudinal cutter edge 22 of about 30° included angle, after which the blade is hardened. The outer extremity of the blade is provided with an abutment 23 which extends upwardly above cutter edge 22 for a purpose to be described.

Floating blade 14 is also sharpened to provide a cutting edge 25, which in this case is serrated at 26 for more effective initial penetration of the material of the brick or other masonry object to be cut.

In this connection, a physical penetration of no more than one eighth inch by blade 14 will induce a complete cleavage across the brick on a clean and sharply defined line of severance. The outward extremity of blade 14 carries a downwardly extending abutment 27 in vertical register with abutment 23 on fixed blade 12. The top of floating blade 14 has a hardened impact anvil 28 secured thereto at its midpoint, as by welding, and this anvil has the effect of distributing shear, occasioned by a blow thereon, uniformly along the serrated cutting edge 25 of blade 14.

The inner end of blade 14 is apertured at 29 (Fig. 3) to removably receive a short cylindrical restraining trunnion pin 30 of slightly less diameter than the width of guide way 17. The fit of pin 30 in blade aperture 29 is sufficiently snug to hold the pin in place during normal use of the cutter, but will permit manual displacement of the pin when it is desired to remove the latter from guide 13 for replacement or sharpening. Pin 30 is received with a sufficiently loose fit in blade guide channel or way 17 of guide 13 to enable free vertical sliding of the blade in the way. The blade also has free pivotal movement in the way to facilitate the adjusting of knife edge 25 in proper parallel contact with the top of an object to be severed.

As illustrated in Figs. 1, 2 and 3, the base 11 of the cutter is supported above a surface on which the device is placed by means of parallel end bars 32 appropriately secured thereto. A channel-like bottom recess 33 is afforded between these bars and across the width of base 11 for the reception of the adjustable gauge 15, permitting horizontal swinging of the gauge in the fashion indicated in solid and dotted lines in Fig. 3. The base is drilled centrally and equidistantly on opposite sides of blades 12, 14 to provide gauge pivot holes 34, either of which will receive a gauge pivot stud 35. Stud 35 is rigidly secured to a horizontal tongue bar 36 of gauge 15, as illustrated in Fig. 6, and a wing nut 37 is applied to the upper end of stud 35 to clamp gauge 15 fixedly in one of the angular adjustments suggested in Fig. 3.

The tongue 36 of gauge 15 has an elongated slot 38 extending from a point midway of its length to its outer end, and a rest-on block 39 is mounted for sliding adjustment along the slot. To this end block 39 has a bottom groove 40 which straddles tongue 36, and a clamp screw 41 (Fig. 6) is received upwardly in slot 38. The screw is tapped into block 39 to hold the latter in a desired longitudinally adjusted position. Tongue 36 and block 39 rest on the same surface that supports bars 32 of base 11 and the abutment 39 is co-extensive in height with the cutting edge 22 of fixed blade 12. In this manner a minimum obstruction is presented to the rapid placement and gauging of a brick B (Fig. 6), and the brick may rest on the top surface of rest-on block 39 to gauge the brick in a horizontal plane for a desired line of cut in the plane of blades 12, 14.

The longitudinal adjustment and clamping of block 39 is rapidly and easily made as desired, and angular cuts are also easily and quickly set up by simply loosening and resetting wing nut 37. As an aid in making angle cuts, a calibration 42 in degrees may be scribed on the upper surface of gauge tongue 36, adjacent a side edge of base 11, and the edge in question may also be scribed at 43 for co-action with this calibration.

Further detailed description of the operation of the device is believed unnecessary. As illustrated in Figs. 1 through 6, the cutter is shown as it is used most commonly in the cutting of bricks and like objects of considerably smaller width than length, i. e., across the width thereof. In the event it is desired to split a brick lengthwise, a cut not accommodated by the relatively short blades 12, 14 of Fig. 1, the invention contemplates the use, as shown in Fig. 7, of a substitute set of fixed lower and floating upper blades, designated 44, 45, respectively. In reference to other structural features, the adaptation of Fig. 7 is identical to that of Figs. 1 through 6, hence corresponding reference numerals are employed.

Floating blade 45 differs from blade 14 solely in relation to its length, being substantially longer, and blade 44 is correspondingly longer than blade 12. The additional length of blade 44 includes an integral bottom abutment member 46 which is formed by notching the blade at its outer bottom end to define an inner upright end abutment shoulder 47. The vertical depth of this shoulder equals the combined thickness of base 11 itself and its bottom spacer bars 32, and the inward spacing of shoulder 47 from the outer extremity of blade 44 is such that its upwardly projecting stop abutment 23 is in vertical register with the depending stop abutment 27 of floating blade 45. Fixed blade 44 is held on base 11 by set screws 19, as in the case of Figs. 1 through 6.

Thus a simple substitute arrangement is afforded by which conventional short fixed and floating blades 12, 14 may be replaced in a moment's time and with little or no trouble by the special, longer fixed and floating blades 44 and 45 of Fig. 7. Full assurance is had that the blades are in proper positional relationship to the upright guide 13, which controls the floating pivotal and translational movements of the upper blade in accordance with either adaptation of the invention.

When a brick is properly positioned between blades 12, 14 or 44, 45 by resting its surface on block 39, a sharp blow on anvil 28 suffices to drive the floating blade into the material of the brick and sever the same. As stated above, an initial penetration of no more than an eighth of an inch causes cleavage through the full depth of the article, due to the concentration of shear stress at the line cutting edges 22, 25.

A simple adaptation of the invention in a portable brick cutter has been shown, and various modifications of the same are possible. For example, the localizing anvil 28 might be constructed as an integral formation on blade 14 rather than a member welded thereto. Similarly, a welded connection of the upright guide 13 to member 11 may be replaced by a removable, though equally rigid connection, in the interest of better adapting the device for shipment. Other changes and modifications will occur to those skilled in the art.

What we claim as our invention is:

1. A portable manually operated device for cutting bricks and the like comprising a base, a fixed elongated blade rigidly secured to said base, said fixed blade extending vertically upwardly from said base and having an upper cutting edge, a movable elongated blade directly above said fixed blade and having a lower cutting edge opposed to the upper cutting edge of said fixed blade, means mounting said movable blade for sliding movement and for swinging movement about one end thereof relative to said fixed blade in a vertical plane including said fixed blade, said mounting means including a guide fixed to said base at one end of said fixed blade and extending vertically upwardly from said base, means connecting said one end of said movable blade to said guide for vertical sliding movement along said guide and for swinging movement in a vertical plane to permit the insertion of a brick or the like to be cut into the space between said blades by movement of the brick in a lengthwise direction relative to said blades between the swinging end of said movable blade and the corresponding end of said fixed blade when said movable blade is moved upwardly by sliding and swinging sufficiently to permit such insertion.

2. A portable manually operated device for cutting bricks and the like comprising a base, a fixed elongated blade rigidly secured to said base, said fixed blade extending vertically upwardly from said base and having an upper cutting edge, a movable elongated blade directly above said fixed blade and having a lower cutting edge opposed to the upper cutting edge of said fixed blade, means mounting said movable blade for sliding movement and for swinging movement about one end thereof relative to said fixed blade in a vertical plane including said fixed blade, said mounting means including a guide fixed to said base at one end of said fixed blade, said guide extending vertically upwardly from said base and having an elongated vertical guideway therein, and a pivot carried by said one end of said movable blade, said pivot being received in said guideway for sliding and pivotal movement to enable the aforesaid sliding and swinging movement of said movable blade and to permit the insertion of a brick or the like to be cut into the space between said blades by movement of the brick in a lengthwise direction relative to said blades between the swinging end of said movable blade and the corresponding end of said fixed blade when said movable blade is moved upwardly by sliding and swinging sufficiently to permit such insertion, said movable blade having an abutment on its swinging end projecting downwardly below the cutting edge thereof, and said fixed blade having an abutment directly beneath said first-mentioned abutment and projecting upwardly above the cutting edge of said fixed blade for engagement with said first-mentioned abutment to prevent engagement of said cutting edges with each other.

3. A portable manually operated device for cutting bricks and the like comprising a base, a fixed elongated blade rigidly secured to said base, said fixed blade extending vertically upwardly from said base and having an upper cutting edge, a movable elongated blade directly above said fixed blade and having a lower cutting edge opposed to the upper cutting edge of said fixed blade, means mounting said movable blade for sliding movement and for swinging movement about one end thereof relative to said fixed blade in a vertical plane including said fixed blade, said mounting means including a guide fixed to said base at one end of said fixed blade, said guide extending vertically upwardly from said base and having an elongated vertical guideway therein, and a pivot carried by said one end of said movable blade, said pivot being received in said guideway for sliding and pivotal movement to enable the aforesaid sliding and swinging movement of said movable blade and to permit the insertion of a brick or the like to be cut into the space between said blades by movement of the brick in a lengthwise direction relative to said blades between the swinging end of said movable blade and the corresponding end of said fixed blade when said movable blade is moved upwardly by sliding and swinging sufficiently to permit such insertion, and an elongated gauge bar extending laterally outwardly from said base and pivoted thereto for horizontal swinging movement, means for releasably locking said gauge bar in selected positions of adjustment, and means providing a brick supporting surface on said gauge bar extending in a horizontal plane including the cutting edge of said fixed blade.

4. The device set forth in claim 3, in which said last-named means comprises a block supported on said gauge bar for sliding movement along the length thereof, and means for releasably locking said block in selected positions along said gauge bar.

5. The device set forth in claim 4 in which said movable blade has an abutment on its swinging end projecting downwardly below the cutting edge thereof, and said fixed blade has an abutment directly beneath said first-mentioned abutment and projecting upwardly above the cutting edge of said fixed blade for engagement with said first-mentioned abutment to prevent engagement of said cutting edges with each other.

References Cited in the file of this patent

UNITED STATES PATENTS

| | | |
|---|---|---|
| 451,778 | Shenton | May 5, 1891 |
| 459,773 | Van Arsdale | Sept. 22, 1891 |
| 812,973 | Barr et al. | Feb. 20, 1906 |
| 1,162,685 | Derbyshire | Nov. 30, 1915 |
| 2,641,845 | Gundlach | June 16, 1953 |
| 2,653,594 | Findley | Sept. 29, 1953 |
| 2,679,840 | Van Loon | June 1, 1954 |